United States Patent
Yoo et al.

(10) Patent No.: US 6,670,956 B2
(45) Date of Patent: Dec. 30, 2003

(54) APPARATUS AND METHOD FOR AUTOMATICALLY CONTROLLING ON-SCREEN DISPLAY FONT HEIGHT

(75) Inventors: Duck-hyun Yoo, Suwon (KR); Jun-hee Jo, Seongnam (KR)

(73) Assignee: Samsung Electronics Co., Ltd. (KR)

(*) Notice: Subject to any disclaimer, the term of this patent is extended or adjusted under 35 U.S.C. 154(b) by 375 days.

(21) Appl. No.: 09/737,507

(22) Filed: Dec. 15, 2000

(65) Prior Publication Data

US 2001/0002835 A1 Jun. 7, 2001

(30) Foreign Application Priority Data

Mar. 11, 2000 (KR) ........................... 2000-12304

(51) Int. Cl.$^7$ ............................................. G06T 11/00
(52) U.S. Cl. ........................................ 345/471; 345/472
(58) Field of Search .......................... 345/472, 472.1, 345/472.2, 948, 471; 715/542, 500; 358/1.11; 348/569, 468

(56) References Cited

U.S. PATENT DOCUMENTS 5,623,316 A * 4/1997 Naito et al. .................. 348/569

FOREIGN PATENT DOCUMENTS

KR 1998-023755 7/1998 ............ G09G/3/28

* cited by examiner

Primary Examiner—Matthew C. Bella
Assistant Examiner—Linzy McCartney
(74) Attorney, Agent, or Firm—Mills & Onello LLP

(57) ABSTRACT

An apparatus and method for automatically setting the height of an on-screen display (OSD) font in a display device which supports a multi-resolution are provided. The apparatus for controlling the OSD font height includes a horizontal line number generator and a font height generator. The horizontal line number generator generates information on the number of horizontal lines of a display region of the display device. The font height generator receives a predetermined font height reference value and the horizontal line number information, obtains automatic font height, and generates the automatic font height. The font height reference number is preferably the number of OSD fonts to be displayed in a vertical direction in the display region. The method for controlling OSD font height includes setting a predetermined font height reference value, obtaining information on the number of horizontal lines of a display region of the display device, and obtaining automatic font height using the horizontal line number information and the font height reference value. According to the invention, the vertical size of the font of the OSD can be automatically maintained to be uniform regardless of the resolution in the display device having the multi-resolution.

9 Claims, 5 Drawing Sheets

APPARATUS AND METHOD FOR AUTOMATICALLY CONTROLLING ON-SCREEN DISPLAY FONT HEIGHT

BACKGROUND OF THE INVENTION

1. Field of the Invention

The present invention relates to a display device, and more particularly, to an apparatus and method for automatically controlling on-screen display (OSD) font height in a display device for supporting a multi-resolution and an OSD processor having the apparatus for automatically controlling the OSD font height.

2. Description of the Related Art

In general, television sets and monitors for computers are types of display devices. Television sets have a uniform resolution, while monitors for computers have multi-resolution, in which the number of horizontal and vertical pixels can vary. The number of horizontal and vertical pixels are changed by the frequency of an input synchronous signal and are expressed as a two-dimensional matrix of numbers of pixels in the display, for example, 640×480, 800×600, etc. A screen which operates as a user interface in the display device is referred to as an on-screen display (OSD). The OSD is another screen which occupies part of or the entire screen of the display device and displays information for interfacing with a user.

In the OSD of a display device having multi-resolution, the horizontal size of the font displayed on the screen can be maintained to be uniform by a phase-locked loop (PLL). That is, even though a horizontal resolution changes, the horizontal size of the font of the OSD does not change. However, the vertical size of the font changes when vertical resolution changes since the font height of the OSD is uniform.

In order to maintain the vertical size of the font of the OSD to be uniform in a multi-display device, the font height of the OSD is manually set in each resolution by a microprocessor. Here, the microprocessor is a controller dedicated to controlling the display device.

Therefore, in a conventional technology, the font height of the OSD must be manually set according to the vertical resolution of the display device in order to make the vertical size of the font of the OSD uniform regardless of the vertical resolution. Since the font height of the OSD is controlled by the microprocessor in software, it places a heavy burden on the microprocessor.

SUMMARY OF THE INVENTION

To solve the above problems, it is an object of the present invention to provide an apparatus for controlling on-screen display (OSD) font height in which the font height of the OSD is automatically set so that the vertical size of the OSD font can be maintained to be uniform regardless of a resolution in a display device having a multi-resolution.

It is another object of the present invention to provide a method for controlling OSD font height in which the font height of the OSD is automatically set so that the vertical size of the OSD font can be maintained to be uniform regardless of a resolution in a display device having a multi-resolution.

It is another object of the present invention to provide an OSD processor having the apparatus for controlling the OSD font height.

In accordance with one aspect of the invention, there is provided an apparatus for controlling on-screen display (OSD) font height in a display device having a multi-resolution. A horizontal line number generator generates information on the number of horizontal lines of a display region of the display device. A font height generator receives a predetermined font height reference value and the horizontal line number information, obtains automatic font height, and generates the automatic font height.

In one embodiment, the font height reference number is the number of OSD fonts to be displayed in a vertical direction in the display region.

In another aspect of the invention, there is provided a method for controlling OSD font height in a display device having a multi-resolution. A predetermined font height reference value is set. Information on the number of horizontal lines of a display region of the display device is obtained. Automatic font is obtained height using the horizontal line number information and the font height reference value.

In one embodiment, the font height reference value is the number of OSD fonts to be displayed in a vertical direction in the display region.

In accordance with a third aspect of the invention, there is provided an OSD processor for controlling an OSD in a display device having a multi-resolution. The processor includes a data receiving block for receiving the font height reference value input from an external microprocessor. A timing controller generates timing information having a vertical synchronous signal for the vertical synchronization of a signal displayed in a display region of the display device and a horizontal synchronous signal for the horizontal synchronization of a signal displayed in a display region of the display device. An OSD font height controlling apparatus obtains automatic font height using the font height reference value input from the data receiving block and the horizontal line number information of the display region and outputs the automatic font height as a font height set value. An outputting unit controls font data according to the font height set value and generates an output signal to be displayed in the display region in accordance with the timing information. The OSD font height controlling apparatus includes a horizontal line number generator for generating the horizontal line number information and a font height generator for receiving the font height reference value and the horizontal line number information and obtaining automatic font height.

According to the apparatus and method for controlling the OSD font height, it is possible to automatically maintain the vertical size of the font of the OSD regardless of resolution in the display device having the multi-resolution.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Figure 1:
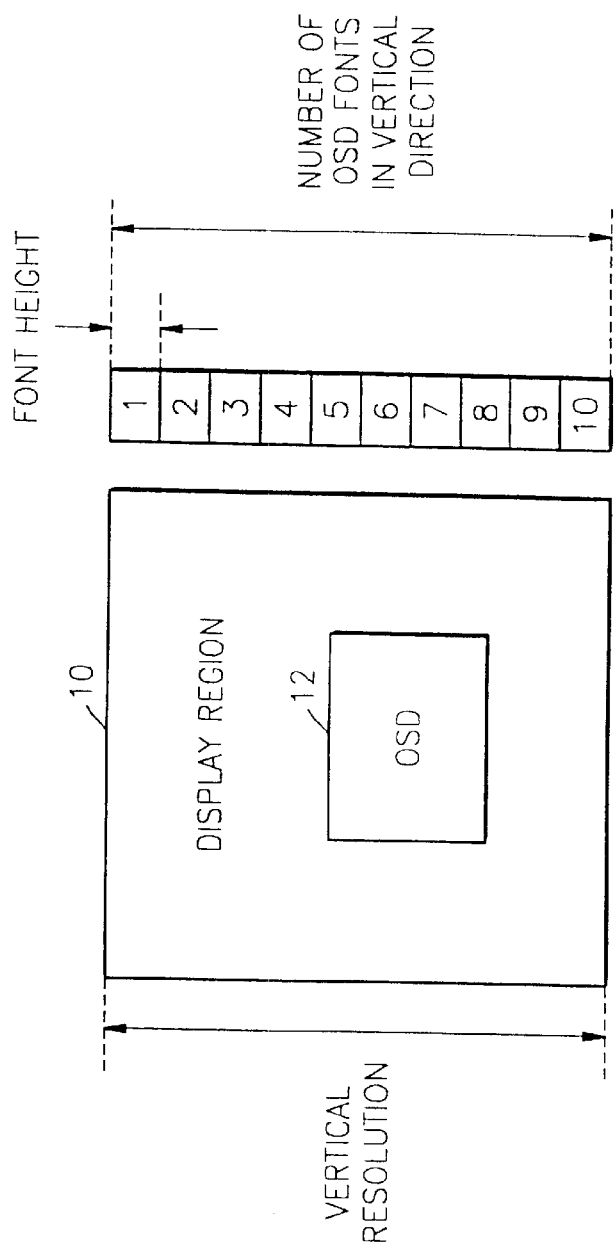
FIG. 1 illustrates an approach for controlling on-screen display (OSD) font height in accordance with an embodiment of the present invention.

FIG. 1 illustrates an approach to controlling on-screen display (OSD) font height according to the present invention. Referring to FIG. 1, an OSD 12 exists in a display region 10. The size of the OSD 12 is equal to or less than that of the display region 10.

A vertical resolution is the number of pixels in the vertical direction of the display region 10. The number of pixels in the vertical direction is equal to the number of lines scanned in a horizontal direction for a frame in a display device in which a raster scanning method is used, that is, the number of horizontal lines. The frame is a unit of information generated by scanning the display region 10 once. Therefore, the number of horizontal lines of the display region 10 is the vertical resolution.

In the present invention, a reference value is set in order to maintain the vertical direction size of the font of the OSD to be uniform even though the vertical resolution changes. A preferable font height reference value is the number of OSD fonts to be displayed in the vertical direction in the display region. In FIG. 1, the number of OSD fonts in the vertical direction is set to be 10. When the number of OSD fonts in the vertical direction is fixed, the total number of OSD fonts in the vertical direction which can be displayed in the display region 10 is uniform even though the vertical resolution changes. Therefore, the vertical direction size of the font displayed in the OSD looks uniform. At this time, the height of a font of the OSD can be obtained as follows.

$$\text{OSD font height}=\text{vertical resolution}/\text{the set number of OSD fonts in a vertical direction} \quad (1)$$

Here, the vertical resolution is the number of horizontal lines of the display region 10. Therefore, the OSD font height is the number of horizontal lines required for displaying a font. Therefore, it is possible to automatically obtain the OSD font height for maintaining the vertical direction size of the OSD font to be uniform according to the vertical resolution by Equation 1.

Figure 2:
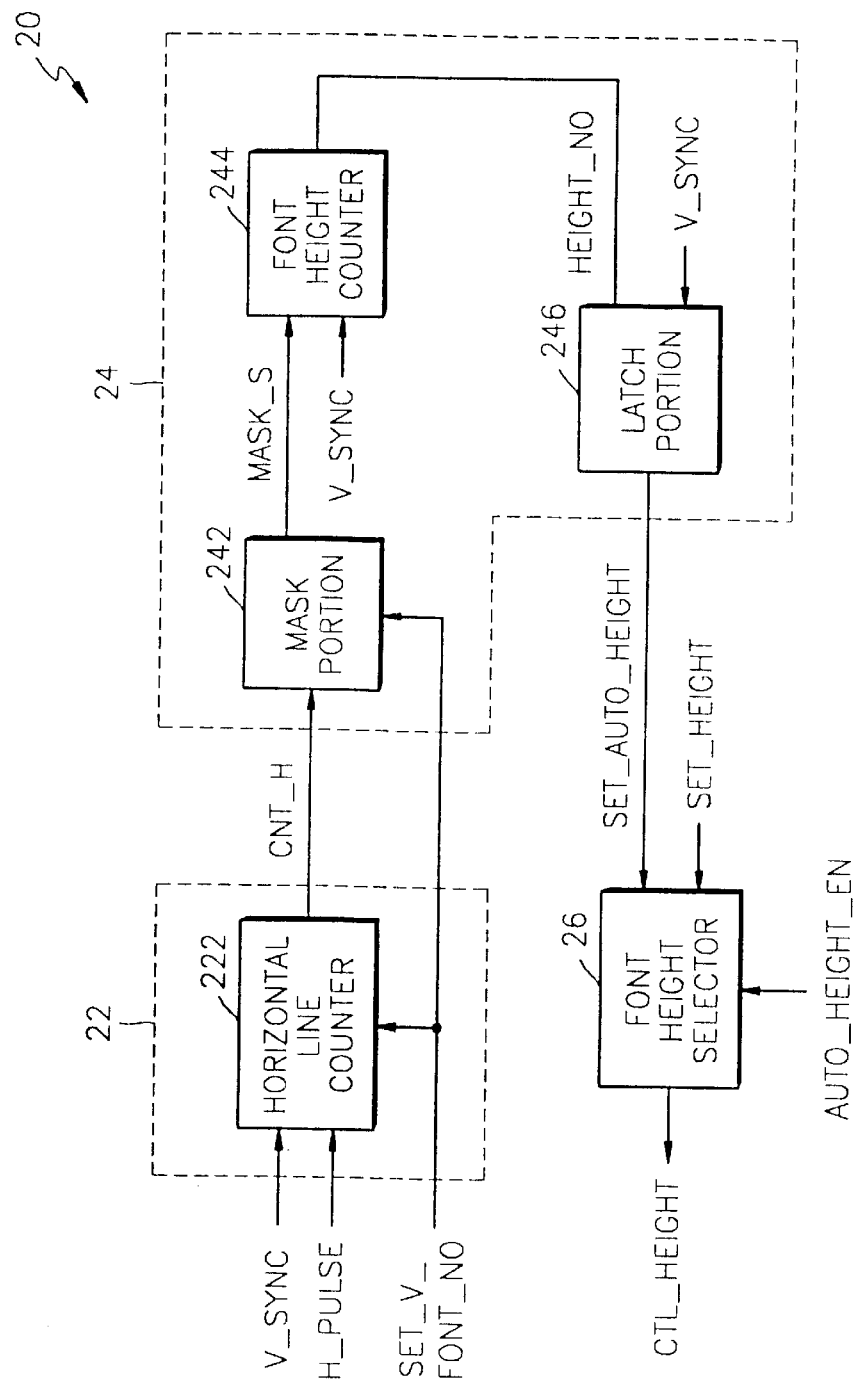
FIG. 2 is a block diagram showing an apparatus for controlling OSD font height according to an embodiment of the present invention.

FIG. 2 is a block diagram showing an apparatus for controlling OSD font height according to an embodiment of the present invention. Referring to FIG. 2, an OSD font height controlling apparatus 20 according to an embodiment of the present invention includes a horizontal line number generator 22 and a font height generator 24.

The horizontal line number generator 22 generates information on the number of horizontal lines of the display region of the display device. The font height generator 24 obtains an automatic font height (SET_AUTO_HEIGHT) using a font height reference value and the information on the number of horizontal lines and outputs the obtained automatic font height (SET_AUTO_HEIGHT).

The font height reference value is preferably the number of OSD fonts (SET_V_FONT_NO) to be displayed in the vertical direction in the display region, as described in FIG. 1. The number of OSD fonts (SET_V_FONT_NO) is set by a user.

The horizontal line number generator 22 includes a horizontal line counter 222. The horizontal line counter 222 counts a horizontal synchronous signal (H_PULSE) and outputs a horizontal line count value (CNT_H) as the information on the number of horizontal lines. The horizontal synchronous signal (H_PULSE) is a signal for synchronizing a horizontal line. One horizontal line starts in accordance with the activation of the horizontal synchronous signal (H_PULSE). Therefore, the activation frequency of the horizontal synchronous signal (H_PULSE) in a frame is equal to the number of horizontal lines. The horizontal line count value (CNT_H) is reset when the horizontal line count value (CNT_H) is equal to the number of set OSD fonts (SET_V_FONT_NO), and the horizontal synchronous signal (H_PULSE) is counted again. The horizontal line count value (CNT_H) is also reset to an initial value in response to the activation of the vertical synchronous signal (V_SYNC). The vertical synchronous signal (V_SYNC) is a signal for synchronizing the frame.

The font height generator 24 includes a mask portion 242, a font height counter 244, and a latch portion 246. The mask portion 242 receives the horizontal line count value (CNT_H) and outputs a mask signal (MASK_S) activated when the horizontal line count value (CNT_H) is equal to the number of set OSD fonts (SET_V_FONT_NO). Therefore, the mask signal (MASK_S) is activated once every number of set OSD fonts (SET_V_FONT_NO). The font height counter 244 counts the activation frequency of the mask signal (MASK_S) and outputs the activation frequency. The latch portion 246 receives the count value (HEIGHT_NO) of the activation frequency of the mask signal and latches the corresponding count value (HEIGHT_NO) when a vertical synchronous signal (V_SYNC) is activated to an automatic font height (SET_AUTO_HEIGHT). Therefore, the automatic font height (SET_AUTO_HEIGHT) is latched in units of a frame.

The OSD font height controlling apparatus 20 according to the present invention can further include a font height selector 26. The font height selector 26 selects either automatic font height (SET_AUTO_HEIGHT) or a manual font height (SET_HEIGHT) and outputs the selected one to a font height set value (CTL_HEIGHT), in response to a control signal (AUTO_HEIGHT_EN). Here, the manual font height (SET_HEIGHT) refers to the font height of the OSD, which is manually set in software according to each resolution.

Figure 3:
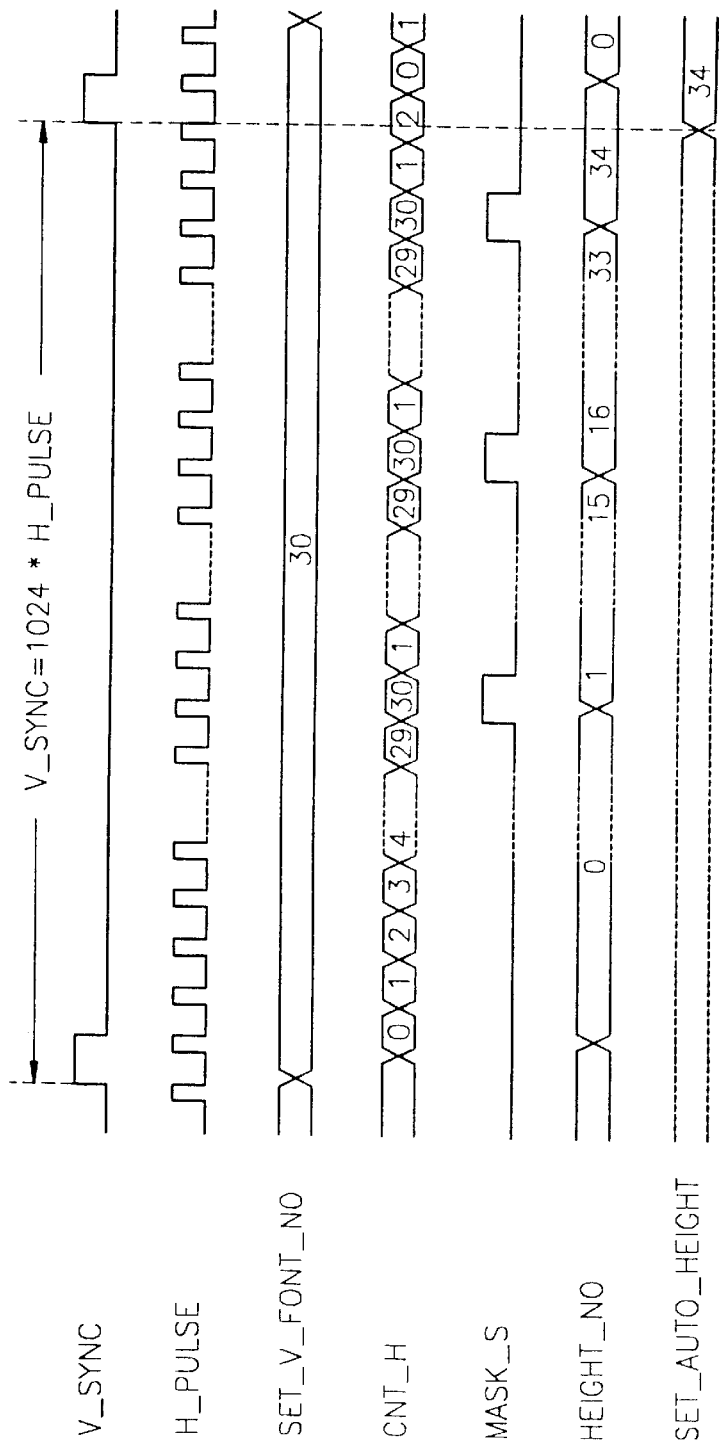
FIG. 3 is a timing diagram which illustrates the waveforms and values of selected signals in the apparatus for controlling the OSD font height of FIG. 2.

FIG. 3 shows the waveforms and values of selected signals in the apparatus for controlling the OSD font height of FIG. 2. Referring to FIG. 3, the operation of the on-screen display font height controlling apparatus 20 of FIG. 2 will now be described.

The vertical synchronous signal (V_SYNC) and the horizontal synchronous signal (H_PULSE) are input to the horizontal line counter 222. The number of frames per second and the number of horizontal lines in a frame are determined according to the frequencies, that is, the activation frequencies, of the vertical synchronous signal (V_SYNC) and the horizontal synchronous signal (H_PULSE). In the present embodiment, it is assumed that the horizontal synchronous signal (H_PULSE) is activated 1024 times from one point of time at which the vertical synchronous signal (V_SYNC) is activated to the next point of time at which the vertical synchronous signal (V_SYNC) is activated (that is, in one frame).

The number of OSD fonts (SET V_FONT_NO) to be displayed in the vertical direction in the display region is set. Here, it is assumed that the set number of OSD fonts (SET_V_FONT_NO) is 30.

The horizontal line counter 222 counts the activation frequency of the horizontal synchronous signal (H_PULSE)

and continuously outputs the horizontal line count value (CNT_H). Therefore, the horizontal line count value (CNT_H) continuously increases by 1 from an initial value 0. When the horizontal line count value (CNT_H) becomes equal to the set number of OSD fonts (SET_V_FONT_NO) 30, the horizontal number counter 222 resets the horizontal line count value (CNT_H) and counts the horizontal line count value (CNT_H) from 1 again. The horizontal line count value (CNT_H) is reset to the initial value 0 when the vertical synchronous signal (V_SYNC) is activated.

The mask signal (MASK_S) activated whenever the continuously generated horizontal line count value (CNT_H) is equal to the set number of OSD fonts (SET V_FONT_NO) 30 is output by the mask portion 242. The font height counter 244 counts the activation frequency of the mask signal MASK_S and outputs the counted activation frequency. Therefore, the counted value (HEIGHT_NO) increases by 1 from the initial value 0 and is reset to the initial value 0 when the vertical synchronous signal (V_SYNC) is activated.

The latch portion 246 latches the counted value (HEIGHT_NO) output from the font height counter 244 to the automatic font height (SET_AUTO_HEIGHT) in response to the activation of the vertical synchronous signal (V_SYNC). Here, since the activation frequency of the horizontal synchronous signal (H_PULSE) in one frame is 1024 and the set number of OSD fonts (SET_V_FONT_NO) is 30, the output automatic font height (SET_AUTO_HEIGHT) is 34.

In the present embodiment, the information on the number of horizontal lines output from the horizontal line number generator 22 is the horizontal line count value (CNT_H) reset whenever the horizontal line count value (CNT_H) is equal to the set number of OSD fonts (SET_V_FONT_NO). However, the information on the number of horizontal lines can be the activation frequency of the horizontal synchronous signal (H_PULSE) continuously counted until the next point of time at which the vertical synchronous signal (V_SYNC) is activated. In this case, the information on the number of horizontal lines finally has the vertical resolution value. Therefore, the font height generator 24 can be transformed to a block for dividing the information on the number of horizontal lines with the number of OSD fonts (SET_V_FONT_NO) according to the pattern of the input horizontal line number information and outputting the automatic font height (SET_AUTO_HEIGHT). Also, the information on the number of horizontal lines can be obtained not only by counting the horizontal synchronous signal (H_PULSE) but also through the resolution value set by a user in a personal computer (PC).

Figure 4:
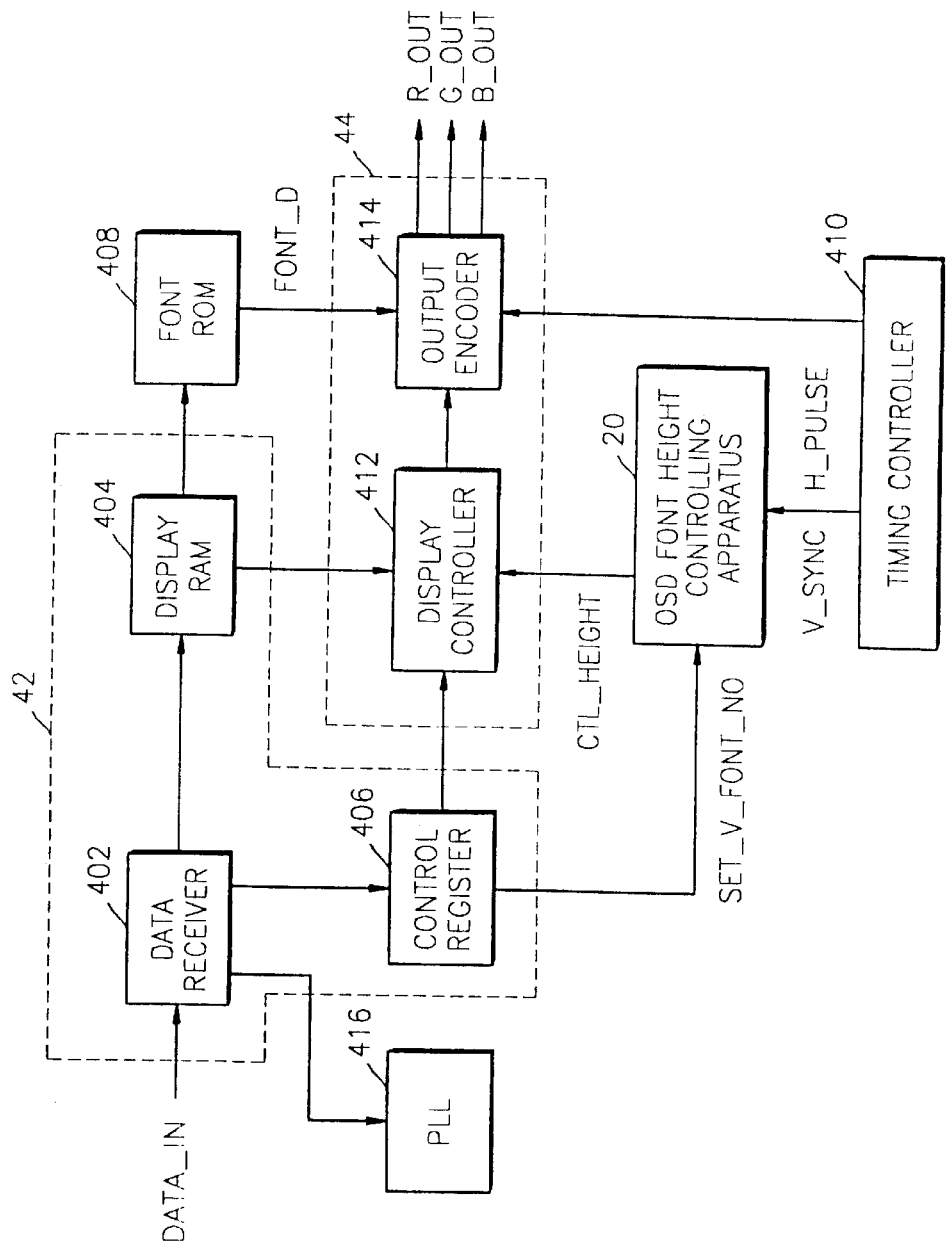
FIG. 4 is a block diagram showing an OSD processor having the apparatus for controlling the OSD font height according to an embodiment of the present invention.

The apparatus for controlling the OSD font height according to the present invention is preferably realized as hardware in the OSD processor, The OSD processor is a chip for controlling the OSD. FIG. 4 is a block diagram of the OSD processor having the apparatus for controlling OSD font height according to an embodiment of the present invention.

The OSD processor includes various internal blocks. The data receiver 402 receives data (DATA_IN) input from an external microprocessor (not shown) and stores the received data (DATA_IN) in a display RAM 404 and a control register 406. The display RAM 404 is a memory for storing control data in units of a font. Data corresponding to frame controlling among input data (DATA_IN) is stored in the control register 406. The set number of OSD fonts (SET V_FONT_NO) is input to the OSD font height controlling apparatus 20 through the data receiver 402 and the control register 406. The data receiver 402, the control register 406, and the display RAM 404 are included in a data receiving block 42 for receiving and storing the input data (DATA_IN) from the outside.

The vertical synchronous signal (V_SYNC) and the horizontal synchronous signal (H_PULSE) are output from a timing controller 410 and input to the OSD font height controlling apparatus 20. The timing controller 410 is a block for generating various timing information items required for operating the OSD. Since the operation of the OSD font height controlling apparatus 20 was described in detail with reference to FIG. 2, repetition of the description thereof will be omitted. The font height set value (CTL_HEIGHT) output from the OSD font height controlling apparatus 20 is input to a display controller 412 in order to control the height of the OSD font. If the font height selector 26 does not exist in the OSD font height controlling apparatus 20, the automatic font height (SET_AUTO_HEIGHT) will be input to the display controller 412 instead of the font height set value (CTL_HEIGHT).

The display controller 412, which is a block for generating various control signals corresponding to the special effects of the OSD, controls visual special effects such as a shadow effect and a scroll function in addition to a font height controlling function. Data corresponding to the OSD font are stored in a font ROM 408. An output encoder 414 generates final output signals (R_OUT, G_OUT, and B_OUT) to be displayed in the screen of the display device by combining the special effects generated by the display controller 412 with the font data (FONT_D) provided by the font ROM 408. The output encoder 414 outputs the output signals (R_OUT, G_OUT, and B_OUT) in accordance with the timing information provided by the timing controller 410. Therefore, the display controller 412 and the output encoder 414 are included in an output unit 44 for controlling the font data (FONT_D) according to the font height set value (CTL_HEIGHT) and outputting the final output signals (R_OUT, G_OUT, and B_OUT). The OSD processor can further include a phase-locked loop (PLL) 416 for generating clock signals, in addition to the above-mentioned blocks.

FIG. 4 shows an example in which the OSD font height controlling apparatus 20 is realized by one independent block. However, the OSD font height controlling apparatus 20 can be included in other blocks such as the timing controller in the OSD processor. Therefore, various embodiments different from the embodiment shown in FIG. 4, in which the OSD font height controlling apparatus according to the present invention is realized as hardware in the OSD processor, can be implemented.

Figure 5:
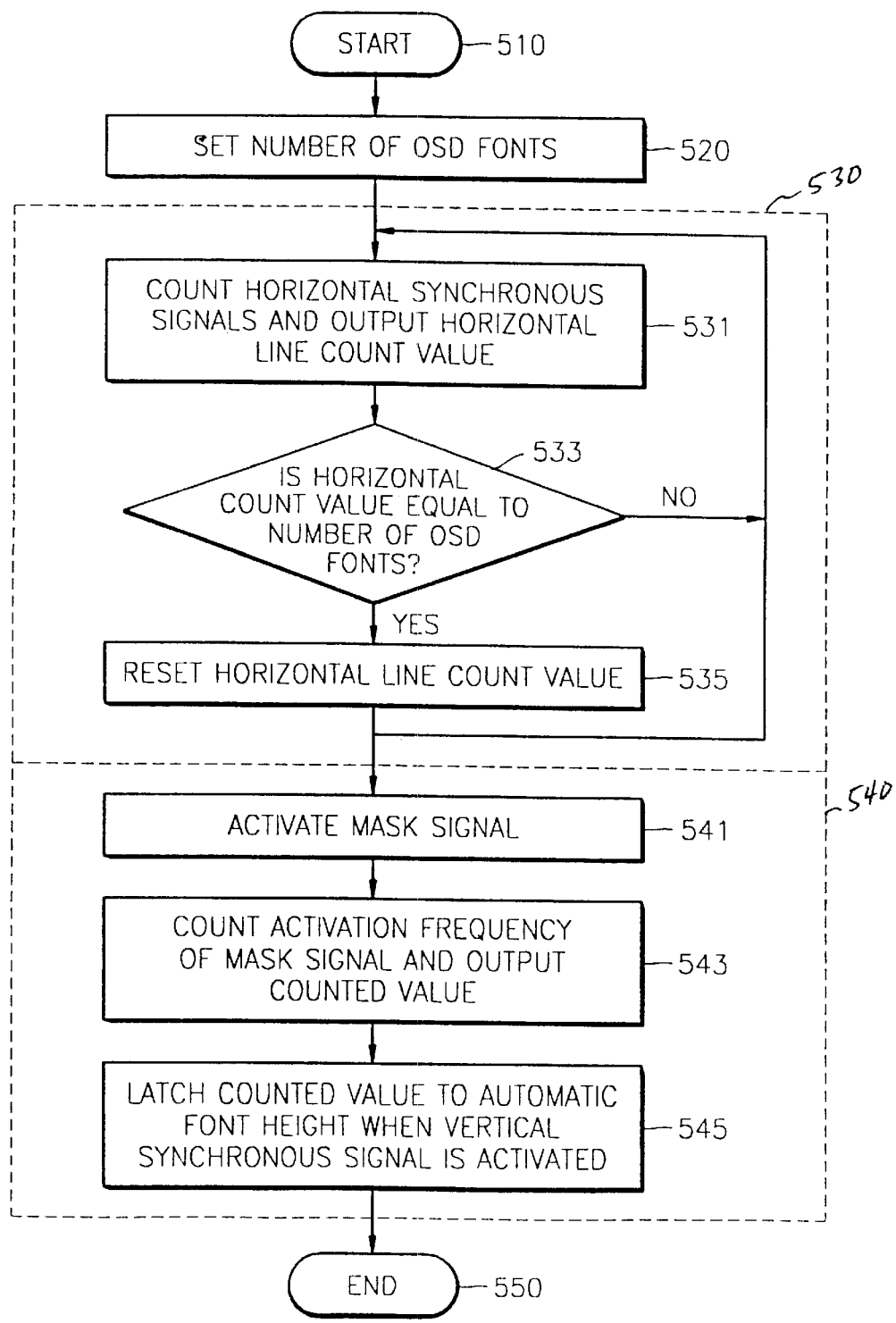
FIG. 5 is a flowchart showing a method for controlling OSD font height according to an embodiment of the present invention.

FIG. 5 is a flowchart describing a method for controlling the OSD font height according to an embodiment of the present invention. The OSD font height controlling apparatus shown in FIG. 2 can operate according to the OSD font height controlling method shown in FIG. 5.

First, a font height reference value is set (step 520). A preferable font height reference value is the number of OSD fonts to be displayed in a vertical direction in the display region, as mentioned above.

The information on the number of horizontal lines of the display region of the display device is obtained (step 530). The step 530 preferably includes a step 531 for counting horizontal synchronous signals and outputting a horizontal line count value as the information on the number of horizontal lines. It is determined whether the horizontal line count value is equal to the number of OSD fonts (step 533) and the horizontal line count value is reset when the horizontal line count value is equal to the number of OSD fonts (step 535). Then, the horizontal synchronous signals are counted again. Here, the information on the number of horizontal lines can be obtained not only by counting the horizontal synchronous signals but also through the set resolution value as mentioned above.

The automatic font height is obtained using the information on the number of horizontal lines and the font height reference value (step 540). The step 540 can be preferably divided into the following steps. First, a mask signal activated when the horizontal line count value is equal to the number of OSD display fonts (step 541) is output. Then, the activation frequency of the mask signal is counted and the counted value is output (step 543). The counted value is received and the received value is latched to the automatic font height in response to the activation of the vertical synchronous signal (step 545).

The method for controlling the on-screen font according to the present invention can further include a step of selecting either the automatic font height or the manual font height and outputting the selected one as the final font height set value. The manual font height refers to the font height of the OSD which is manually set as software according to each resolution.

It is possible to automatically maintain the vertical size of the font of the OSD to be uniform regardless of the resolution in the display device having the multi-resolution by the apparatus for controlling the OSD font height and the method therefor according to the present invention. It is possible to reduce the software burden of the micro controller by realizing the apparatus for controlling the OSD font height according to the present invention in the OSD processor as hardware.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for controlling on-screen display (OSD) font height in a display device having a multi-resolution, comprising:

a horizontal line number generator for generating information on the number of horizontal lines of a display region of the display device, the horizontal line number generator comprising a horizontal line counter for counting horizontal synchronous signals and outputting a horizontal line count value as the horizontal line number information and wherein the horizontal line count value is reset when the horizontal line count value is equal to the number of OSD fonts; and a font height generator for receiving a predetermined font height reference value and the horizontal line number information, obtaining automatic font height, and generating the automatic font height, the font height reference value being the number of OSD fonts to be displayed in a vertical direction in the display region.

2. The apparatus of claim 1, wherein the font height generator comprises:

a mask portion for receiving the horizontal line count value and outputting a mask signal activated when the horizontal line count value is equal to the number of OSD fonts;

a font height counter for receiving the mask signal, counting the activation frequency of the mask signal, and outputting the counted value; and a latch portion for receiving the counted value, responding to the activation of a vertical synchronous signal, and latching the counted value to the automatic font height.

3. The apparatus of claim 1, further comprising a font height selector for receiving the automatic font height and a manual font height, selecting one of the automatic font height and the manual font height, and outputting the selected one of the automatic font height and the manual font height as a font height set value in response to a control signal.

4. A method for controlling OSD font height in a display device having a multi-resolution, comprising the steps of:

(a) setting a predetermined font height reference value, said font height reference value being the number of OSD fonts to be displayed in a vertical direction in a display region;

(b) obtaining information on the number of horizontal lines of the display region of the display device, said obtaining information comprising counting horizontal synchronous signals and outputting a horizontal line count value as the horizontal line number information, and wherein the horizontal line count value is reset when the horizontal line count value is equal to the number of OSD fonts; and (c) obtaining an automatic font height using the horizontal line number information and the font height reference value.

5. The method of claim 4, wherein step (c) comprises the steps of:

receiving the horizontal line count value and outputting a mask signal activated when the horizontal line count value is equal to the number of OSD fonts;

receiving the mask signal, counting the activation frequency of the mask signal, and outputting the counted value; and receiving the counted value and latching the counted value to the automatic font height in response to the activation of a vertical synchronous signal.

6. The method of claim 4, further comprising the steps of receiving the automatic font height and a set font height, selecting one of the automatic font height and the set font height and outputting the selected one of the automatic font height and the set font height as a font height set value in response to a control signal.

7. An on-screen display (OSD) processor for controlling an OSD in a display device having a multi-resolution, comprising:

a data receiving block for receiving a font height reference value input from an external microprocessor, the font height reference value being the number of OSD fonts to be displayed in a vertical direction in the display region;

a timing controller for generating timing information having a vertical synchronous signal for the vertical synchronization of a signal displayed in a display region of the display device and a horizontal synchronous signal for the horizontal synchronization of a signal displayed in a display region of the display device;

an OSD font height controlling apparatus for obtaining automatic font height using the font height reference value input from the data receiving block and the horizontal line number information of the display region and outputting the automatic font height as a font height set value; and an outputting unit for controlling font data according to the font height set value and generating an output signal to be displayed in the display region in accordance with the timing information, wherein the OSD font height controlling apparatus comprises:

a horizontal line number generator for generating the horizontal line number information, the horizontal line number generator comprising a horizontal line counter for counting the horizontal synchronous signals and outputting a horizontal line count value as the horizontal line number information and wherein the horizontal line count value is reset when the horizontal line count value is equal to the number of OSD fonts, and a font height generator for receiving the font height reference value and the horizontal line number information and obtaining automatic font height.

8. The OSD processor of claim 7, wherein the font height generator comprises:

a mask portion for receiving the horizontal line count value and outputting a mask signal activated when the horizontal line count value is equal to the number of OSD fonts;

a font height counter for receiving the mask signal, counting the activation frequency of the mask signal, and outputting the counted value; and a latch portion for receiving the counted value and latching the counted value to the automatic font height in response to the activation of the vertical synchronous signal.

9. The OSD processor of claim 7, wherein thr OSD font height controlling apparatus further comprises a font height selector for receiving the automatic font height and a manual font height, selecting one of the automatic font height and the manual font height, and outputting the selected one of the automatic font height and the manual font height as a font height set value in response to control signal.

* * * * *

UNITED STATES PATENT AND TRADEMARK OFFICE
CERTIFICATE OF CORRECTION

PATENT NO. : 6,670,956 B2
DATED : December 30, 2003
INVENTOR(S) : Duck-hyun Yoo et al.

It is certified that error appears in the above-identified patent and that said Letters Patent is hereby corrected as shown below:

Column 10,
Line 12, delete "thr" and insert -- the --.

Signed and Sealed this

Fourteenth Day of December, 2004

JON W. DUDAS
*Director of the United States Patent and Trademark Office*